United States Patent

Ebstein

Patent Number: 5,734,502
Date of Patent: Mar. 31, 1998

[54] ACHROMATIC DIFFRACTIVE OPTIC

[75] Inventor: Steven Ebstein, Newton, Mass.

[73] Assignee: Lexitek, Inc., Wellesley, Mass.

[21] Appl. No.: 598,169

[22] Filed: Feb. 7, 1996

[51] Int. Cl.$^6$ .............................. G02B 5/18; G02B 27/44
[52] U.S. Cl. .................... 359/569; 359/565; 359/566
[58] Field of Search ................................. 359/565, 566, 359/569, 572, 574

[56] References Cited

U.S. PATENT DOCUMENTS

| | | | |
|---|---|---|---|
| 4,983,002 | 1/1991 | Shikama et al. | 359/566 |
| 5,280,388 | 1/1994 | Okayama et al. | 359/569 |
| 5,434,709 | 7/1995 | Yamada et al. | 359/569 |

Primary Examiner—P. M. Dzierzynski
Assistant Examiner—Audlrey Chang

[57] ABSTRACT

Diffractive optical elements (DOEs) consisting of a sandwich of two materials are described with an interfacial surface whose relief height impresses the desired optical phase. The two materials have nearly matched indices of refraction, so the interfacial surface has a profile that varies by many wavelengths and is easily fabricated. The materials are chosen such that the refractive index difference and dispersion obey a matching condition that renders the optical path difference (OPD) across the element constant across a broad band of wavelengths. This achromatizes the DOE in that the diffraction efficiency is independent of wavelength. This achromatic property and the fabrication ease allowed by the nearly index matched (NIM) materials enables hybrid refractive-diffractive elements to be fabricated by molding processes for broadband applications.

14 Claims, 1 Drawing Sheet

ACHROMATIC DIFFRACTIVE OPTIC

BACKGROUND OF THE INVENTION

Surface-relief diffractive optical elements (DOEs) as described in U.S. Pat. No. 5,218,471 are useful for a variety of optical applications. When a DOE is formed on one surface of an optic with at least one curved surface, the combination is termed a hybrid refractive-diffractive lens as is described in U.S. Pat. No. 5,349,471. This hybrid element has unusual optical properties that can result in optical systems with fewer discrete elements and lower mass and size with comparable optical, thermal, and chromatic properties as conventional optical designs.

However, fabrication of DOEs either as standalone elements or as part of a hybrid is difficult and relies on expensive, capital-intensive processes such as integrated circuit lithography or precise, diamond turning. This results primarily from the necessity to fabricate a surface whose relief height is just the design wavelength of the DOE, $\lambda$, divided by (n−1) where n is the refractive index of the DOE material.

In addition, the DOE only produces the desired optical phase at the design wavelength. Away from that wavelength, the optical path difference (OPD) produced from minimum to maximum surface relief is no longer equal to an integral number of wavelengths. This produces an optical phase that is discontinuous and differs from that of the design wavelegnth, resulting in light being diffracted away from the desired order and reducing the efficiency of the DOE.

Significant economic advantage would result from being able to fabricate DOEs with less expensive processes, thereby reducing their cost. In addition, rendering the optical phase produced independent of wavelength would improve the optical performance of DOEs with broadband light, thereby significantly enhancing their utility for many optical applications. Both of these points are addressed by the subject invention.

SUMMARY OF THE INVENTION

The invention includes a nearly index matched (NIM) optic which comprises a means for receiving light from a light source, the light having a given range of wavelengths and a wavelength within that range specified as the design wavelength; a means for transferring the light across at least a first surface into a first material having a first index of refraction and a first dispersion; a means for transferring the light across at least a first boundary formed in the first material, each point on the first boundary having a surface relief height; and a means for transferring the light across a second boundary formed in a second material that has a second index of refraction and a second dispersion. Each point on the second boundary has a surface relief height that is equal in magnitude to the corresponding point on the first boundary and opposite in sign. The first and second indices are selected such that an index difference equal to the second index of refraction minus the first index of refraction is less than 0.1 at the design wavelength. The first and second dispersions have a first-order dispersion difference equal to the first-order dispersion of the second material at the design wavelength minus the first-order dispersion of the first material at the design wavelength. The materials are chosen such that the ratio of the index difference to the first-order dispersion difference is substantially equal to the design wavelength. The optical path difference (OPD) across the boundaries is reduced by a multiplicative factor equal to the index difference and the optical phase change across the boundaries given by the ratio of the OPD to the wavelength is substantially the same over the range of wavelengths.

DETAILED DESCRIPTION

Figure 1:
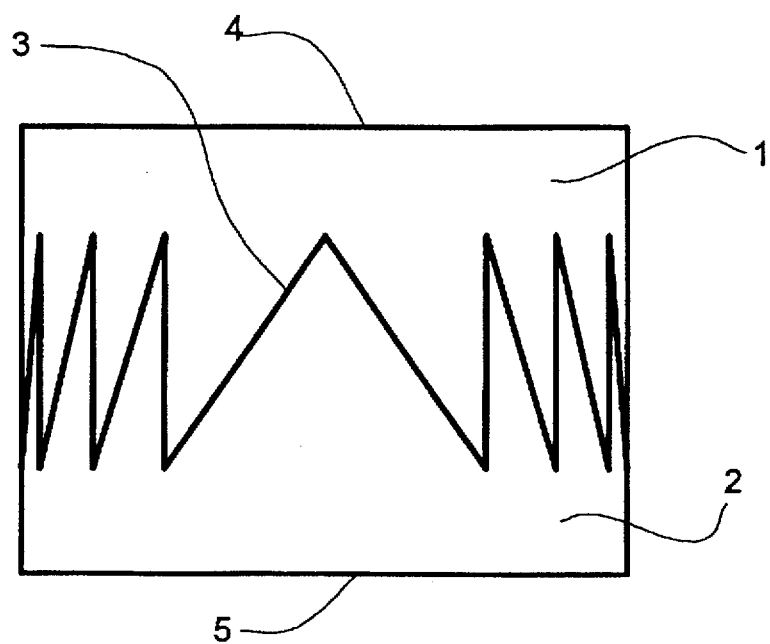
FIG. 1 illustrates a cross-sectional view of a NIM DOE with flat exterior surfaces.

The invention described uses a sandwich of two nearly index matched (NIM) materials, as described in U.S. Pat. No. 5,091,801, to fabricate a diffractive optical element (DOE) with low-cost processes. Choosing materials pairs whose refractive indices and dispersions obey a matching condition achromatizes the phase produced by the NIM DOE. A NIM DOE is fabricated from a sandwich of two materials whose interfacial surface has a relief profile which produces a desired phase. Material 1 has an index of refraction $n_1$ and material 2 has an index $n_2$. The profiles of the outside surface of both materials are the same, nominally flat. Assuming flat exterior surfaces, the optical path difference (OPD) for a ray incident normal to the sandwich is $$OPD = (n_1 - n_2)(h(x) - h_0) \quad (1)$$
$$= \Delta n \Delta h$$

For $(n_1-n_2) \ll 1$, the OPD is equal to a fraction of the surface relief profile, $h(x)$. If the difference in indices is in the range 0.001–0.01, the surface profile can be figured with ~100–1000× less precision than would be necessary if the refracting surface had an air-glass interface. Thus, precise OPDs can be generated using ordinary machining and turning processes. The relief surface is generated by conventional machining with attendant tolerances of ±0.0002 in or ±5 µm. Using the ±5 µm machining tolerance, $\lambda/20$ precision of the OPD (at 633 nm) can be achieved if the index difference is 0.0063.

Owing to the reduced tolerances on the relief surface, compared to optics with an interface with air, both halves of the sandwich can be accurately fabricated by molding and casting processes and by directly machining the surface in an optical material. Glass and plastic are two materials that can easily be molded or machined to the requisite tolerances. Numerous optical cements and plastics can easily be cast into appropriate pieces.

The tolerances are sufficiently relaxed that both halves of the sandwich can be fabricated separately. The resulting pieces are then mated with an optical cement with refractive index similar to both materials. The cement layer is both thin enough and sufficiently uniform in thickness that the resulting OPD and optical phase is dependent only on the two halves of the sandwich.

The exterior surfaces of the NIM DOE can be finished by the same process as is used to finish the relief surface, providing it results in an optically smooth finish. Alternatively, the exterior surfaces can be conventionally ground and polished.

The present invention is an achromatic NIM DOE which produces an optical phase that is substantially independent of wavelength. This condition will obtain if the OPD is proportional to the wavelength, i.e., it satisfies $$\frac{2\pi OPD(\lambda)}{\lambda} = \frac{2\pi OPD(\lambda_0)}{\lambda_0} \quad (2)$$

Material pairs which approximately satisfy equation 2 across a wavelength band of interest are used to produce an achromatic NIM DOE. Such material pairs obey a condition that is derived from an analysis of equation 2 as a function of material dispersion (the variation of refractive index with wavelength).
Writing $$OPD(\lambda)=\Delta h(n_1(\Delta)-n_2(\Delta)) \quad (3)$$

and expanding the index linearly about $\lambda_0$ in terms of its first-order dispersion, d, $$n(\lambda)=n_0+d(\lambda-\lambda_0), \quad (4)$$

equation (2) implies that $$\lambda_0 \Delta d = \Delta n_0 \quad (5)$$

where we have used $$\Delta d = d_1 - d_2 \quad (6)$$

and $$\Delta n_0 = n_1(\lambda_0) - n_2(\lambda_0) \quad (7)$$

Using the definition of the Abbe $V_D$ number, $$V_D = \frac{n_D - 1}{n_F - n_C}, \quad (8)$$

and equation (4) to substitute for $n_F$ and $n_C$, we can transform equation (5) into an expression involving the Abbe V numbers typically used to characterize dispersion at visible wavelengths, $$\frac{\lambda_0}{\lambda_F - \lambda_C} \left[ \frac{n_{D1}-1}{V_{D1}} - \frac{n_{D2}-1}{V_{D2}} \right] = n_{01} - n_{02} \quad (9)$$

Material pairs which satisfy equation 9 or analagous equations for different wavebands or which satisfy equation 5 in the waveband of interest are used to fabricate NIM DOEs. The exterior surfaces, which were assumed flat for simplicity of analysis, can be curved as on any refractive optical element. The resulting optic constitutes a hybrid refractive-diffractive NIM DOE.

A cross-sectional view, not to scale, of a NIM DOE with flat exterior surfaces is pictured in FIG. 1. The element consists of a sandwich of two materials, 1 and 2, with an interfacial surface 3. The exterior surfaces, 4 and 5, are flat so the phase of this element is exactly as analyzed in the equations, above.

Figure 2:
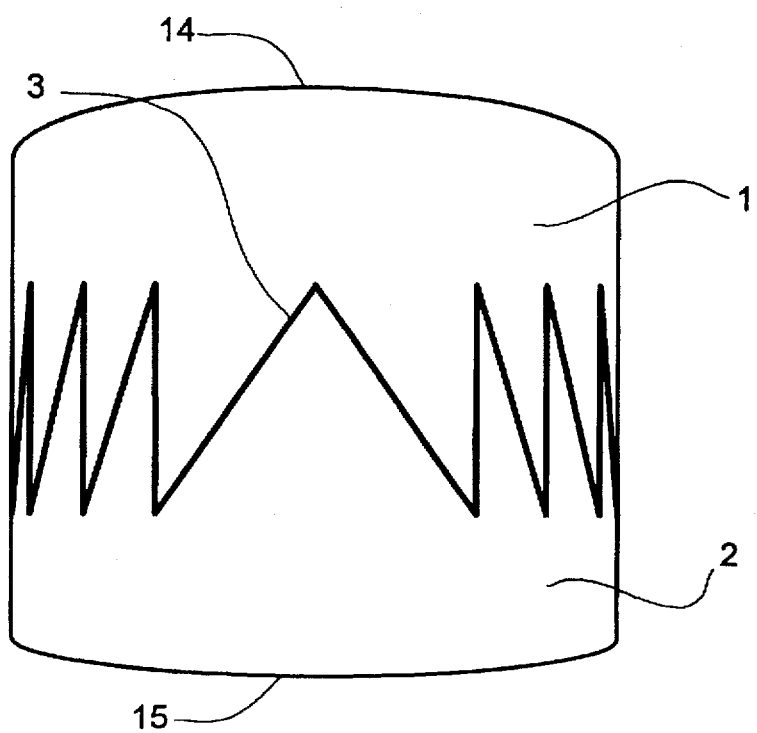
FIG. 2 illustrates a cross-sectional view of a hybrid refractive-diffractive element.

A hybrid refractive-diffractive element is pictured in cross-section in FIG. 2. This element has a NIM DOE at the interface 3 of the two materials, 1 and 2. The curved outer surfaces, 14 and 15, refract light passing through the element and give it the functionality of a refractive-diffractive hybrid.

These new DOEs can be inexpensively produced for certain OPDs. Because the nearly matched indices reduce the tolerance on the surface height, many continuous relief surfaces can be produced by conventional machining rather than diamond turning or laser writing. Consider a rotationally symmetric DOE, i.e., a lens. Using a fine tool and/or by inclining the cutting head, a multi-axis numerically-controlled (NC) milling machine or lathe can reproduce the quadratic OPD of a lens very accurately. The continuous relief surface could be machined in the optical material, directly, or onto a die that is used to cast or mold the surface.

The principles and embodiments of the present invention have been described in the foregoing specification. The invention which is intended to be protected should not, however, be construed as limited to the teachings of the specification because they merely illustrate the invention. There should be other ways to practice the present invention that will come within the meets and bounds of the inventions identified in the following claims as well as within the penumbra of the invention they define.

The embodiments of the invention in which an exclusive property or privilege is claimed are defined as follows:

1. A nearly index matched (NIM) optic comprising:
   means for receiving light from a light source, the light having a given range of wavelengths and a wavelength within that range specified as the design wavelength;
   means for transferring the light across at least a first surface into a first material having a first index of refraction and a first dispersion;
   means for transferring the light across at least a first boundary formed in the first material, each point on the first boundary having a surface relief height; and
   means for transferring the light across a second boundary formed in a second material that has a second index of refraction and a second dispersion, each point on the second boundary having a surface relief height that is equal in magnitude to the corresponding point on the first boundary and opposite in sign, said first and second indices selected such that an index difference equal to the second index of refraction minus the first index of refraction is less than 0.1 at the design wavelength, said first and second dispersions having a first-order dispersion difference equal to the first-order dispersion of the second material at the design wavelength minus the first-order dispersion of the first material at the design wavelength, said materials chosen such that the ratio of the index difference to the first-order dispersion difference is substantially equal to the design wavelength, whereby the optical path difference (OPD) across the boundaries is reduced by a multiplicative factor equal to the index difference and whereby the optical phase change across the boundaries given by the ratio of the OPD to the wavelength is substantially the same over the range of wavelengths.

2. An optical system as claimed in claim 1, wherein the OPD across the boundaries ranges over an integral number of wavelengths, thereby constituting a diffractive optical element (DOE).

3. An optical system as claimed in claim 1, wherein the first surface is flat.

4. An optical system as claimed in claim 1, wherein the first boundary contacts the second boundary; and the second material is a fluid when it first contacts the first material and is fixed by molding against the first material.

5. An optical system as claimed in claim 1, wherein the second boundary is formed by molding the second material against the first material.

6. A lens comprising:
   a first element having a first surface and at least a first optical boundary, every point on the first boundary having a surface relief height, the first element being made from a first material having a first index of refraction and a first dispersion, for a predetermined wavelength range of light; and
   a second element having at least a second optical boundary, each point on the second boundary corresponding to a point on the first optical boundary, each point on the second optical boundary having a surface relief height that is equal in magnitude to the corresponding point on the first boundary and opposite in sign, the second element being made from a second material having a second index of refraction and a second dispersion, said first and second indices selected such that an index difference equal to the second index of refraction minus the first index of refraction is less than 0.1 at the design wavelength, said first and second dispersions having a first-order dispersion difference equal to the first-border dispersion of the second material at the design wavelength minus the first-border dispersion of the first material at the design wavelength, said materials chosen such that the ratio of the index difference to the first-border dispersion difference is substantially equal to the design wavelength, whereby the optical path difference (OPD) across the boundaries is reduced by a multiplicative factor equal to the index difference and whereby the optical phase change across the boundaries given by the ratio of the OPD to the wavelength is substantially the same over the range of wavelengths.

7. A lens as claimed in claim 6, wherein the OPD across the boundaries ranges over an integral number of wavelengths, thereby constituting a diffractive optical element (DOE).

8. A lens as claimed in claim 6, wherein the first surface is flat.

9. A lens as claimed in claim 6, wherein the first boundary contacts the second boundary; and the second material is a fluid when it first contacts the first material and is fixed by molding against the first material.

10. A lens as claimed in claim 6, wherein the second boundary is formed by molding the second material against the first material.

11. A method for producing an optical phase change that is substantially the same over a range of wavelengths, comprising the steps of:

receiving light from a light source, the light having a given range of wavelengths and a wavelength within that range specified as the design wavelength;

transferring the light across at least a first surface into a first material having a first index of refraction and a first dispersion;

transferring the light across at least a first boundary formed in the first material, each point on the first boundary having a surface relief height; and transferring the light across a second boundary formed in a second material that has a second index of refraction and a second dispersion, each point on the second boundary having a surface relief height that is equal in magnitude to the corresponding point on the first boundary and opposite in sign, said first and second indices selected such that an index difference equal to the second index of refraction minus the first index of refraction is less than 0.1 at the design wavelength, said first and second dispersions having a first-order dispersion difference equal to the first-order dispersion of the second material at the design wavelength minus the first-order dispersion of the first material at the design wavelength, said materials chosen such that the ratio of the index difference to the first-order dispersion difference is substantially equal to the design wavelength, whereby the optical path difference (OPD) across the boundaries is reduced by a multiplicative factor equal to the index difference and whereby the ratio of the OPD across the boundaries to the wavelength is substantially the same over the range of wavelengths.

12. A method as claimed in claim 11, wherein the OPD across the boundaries ranges over an integral number of wavelengths, thereby constituting a diffractive optical phase.

13. A method as claimed in claim 11, further comprising the step of reflecting the light off a second surface back towards the second boundary.

14. A method as claimed in claim 13, wherein the OPD across the boundaries ranges over an integral number of wavelengths, thereby constituting a diffractive optical phase.

* * * * *